United States Patent [19]
Baker et al.

[11] 3,773,548
[45] Nov. 20, 1973

[54] METHOD OF MONITORING THE RATE OF DEPOSITING A COATING SOLELY BY ITS OPTICAL PROPERTIES

[75] Inventors: Martin L. Baker; Eugene A. Eufusia, both of Santa Rosa, Calif.

[73] Assignee: Optical Coating Laboratory, Inc., Santa Rosa, Calif.

[22] Filed: Jan. 27, 1972

[21] Appl. No.: 221,397

Related U.S. Application Data

[63] Continuation of Ser. No. 2,789, Jan. 14, 1970, abandoned.

[52] U.S. Cl. .................... 117/106 R, 117/107.1
[51] Int. Cl. .................................. C23c 13/04
[58] Field of Search .................... 117/106, 107.1; 118/8, 7, 49, 49.5, 48, 49.1

[56] References Cited
UNITED STATES PATENTS

| | | | |
|---|---|---|---|
| 3,400,687 | 9/1968 | Lueck | 250/219 |
| 2,951,416 | 9/1960 | Shinn | 117/94 |
| 3,397,672 | 8/1968 | Dykeman et al. | 118/8 |
| 3,168,418 | 2/1965 | Payne, Jr. | 118/7 |
| 3,382,842 | 4/1968 | Stecklmacher et al. | 118/8 |

Primary Examiner—Alfred L. Leavitt
Assistant Examiner—J. Massie
Attorney—Harold C. Hohbach

[57] ABSTRACT

Optical thickness rate monitor for use with a vacuum chamber having an evaporation source. Means is provided for forming an aperture which is exposed to the vapors from the source. An elongate element is provided and means is also provided for progressively advancing the elongate element past the aperture so that it is exposed to the vapor stream from the evaporation source so that any coating material is deposited on the elongate element. Means is provided for supplying a beam of radiation to the element so that the radiation is affected by any coating deposited on the element. Means is then provided for determining the manner in which the radiation is affected by changes in the coating which is being deposited on the element. Automatic means is provided for controlling the rate of evaporation from the evaporation source and monitoring the optical thickness to which the coating is deposited on the element.

7 Claims, 12 Drawing Figures

Patented Nov. 20, 1973

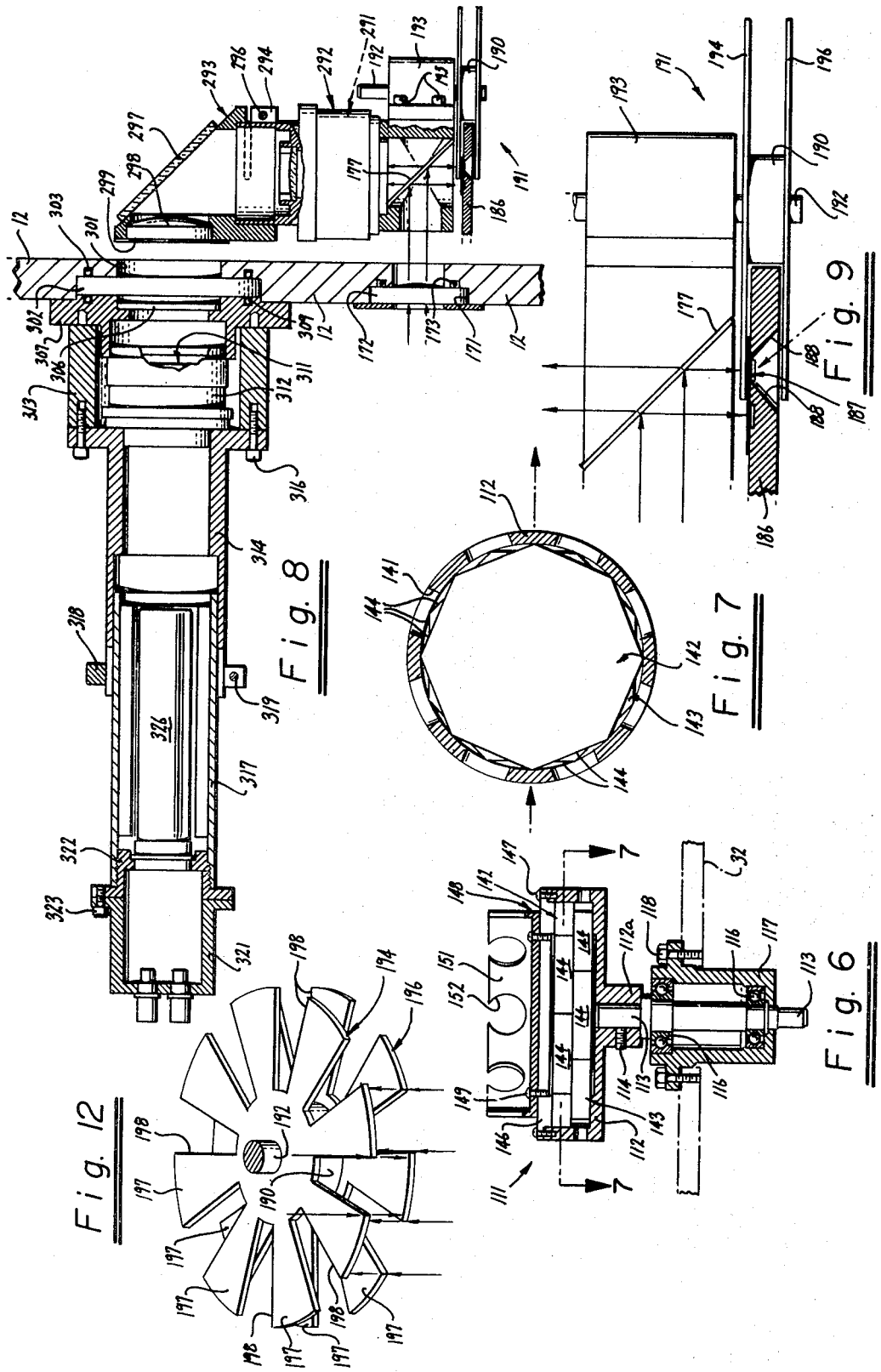

Patented Nov. 20, 1973

METHOD OF MONITORING THE RATE OF DEPOSITING A COATING SOLELY BY ITS OPTICAL PROPERTIES

This is a continuation of application Ser. No. 2,789, filed Jan. 14, 1970, now abandoned.

BACKGROUND OF THE INVENTION

Apparatus has heretofore been provided for measuring evaporation rates from evaporation sources. For example, coating materials have been deposited on quartz crystals which causes the frequency of the crystal to change. Ion gauge evaporation rate monitors have been provided. Another type of rate monitor looks at the plasma surrounding an electron gun evaporation source and utilizes the intensity of the plasma to indicate the rate of evaporation. However, none of such rate monitors monitor the optical thickness of the coating. There is, therefore, a need for a rate monitor which will monitor the optical thickness evaporation rate.

SUMMARY OF THE INVENTION AND OBJECTS

The optical thickness rate monitor is adapted for use with a vacuum chamber having an evaporation source. Means is provided for forming an aperture which is exposed to the vapors from said source. An elongate element is disposed over said aperture on the side opposite said source. Means is provided for progressively advancing the elongate element past the aperture so that successive portions of the elongate element are exposed to the vapors from the source. Means is provided for supplying a beam of radiation to the element so that it is affected by the coating which is deposited on the element. Means is then provided for determining a characteristic of the radiation after it has been affected by the coating deposited on the element. Automatic means is provided for controlling the rate of evaporation from the evaporation source so that the coating material is applied at a predetermined rate.

In general, it is an object of the present invention to provide an optical thickness rate monitor which monitors the optical thickness evaporation rate.

Another object of the invention is to provide a monitor and method of the above character in which the optical thickness rate can be monitored over long periods of time.

Another object of the invention is to provide a monitor and method of the above character in which a dual beam is utilized.

Another object of the invention is to provide a monitor and method of the above character in which the monitoring is carried out by depositing the coating on one side of the element and viewing the element from the other side.

Another object of the invention is to provide a monitor and method of the above character in which the film is not monitored during the time that coating material is being placed on the film.

Another object of the invention is to provide a monitor and method of the above character which can be set for a predetermined rate of evaporation from the evaporation source and which thereafter will be controlled automatically.

Additional objects and features of the invention will appear from the following description in which the preferred embodiment is set forth in detail in conjunction with the accompanying drawing.

BRIEF DESCRIPTION OF THE DRAWING

FIG. 6 is a side elevational view in cross-section of the octagon prism assembly.

FIG. 7 is a cross-sectional view taken along the line 7—7 of FIG. 6.

FIG. 8 is an enlarged cross-sectional view showing additional portions of the monitor.

FIG. 9 is an enlarged view of a portion of the structure shown in FIG. 8.

FIG. 12 is an enlarged isometric view showing the chopper assembly.

DESCRIPTION OF THE PREFERRED EMBODIMENT

Figure 1:
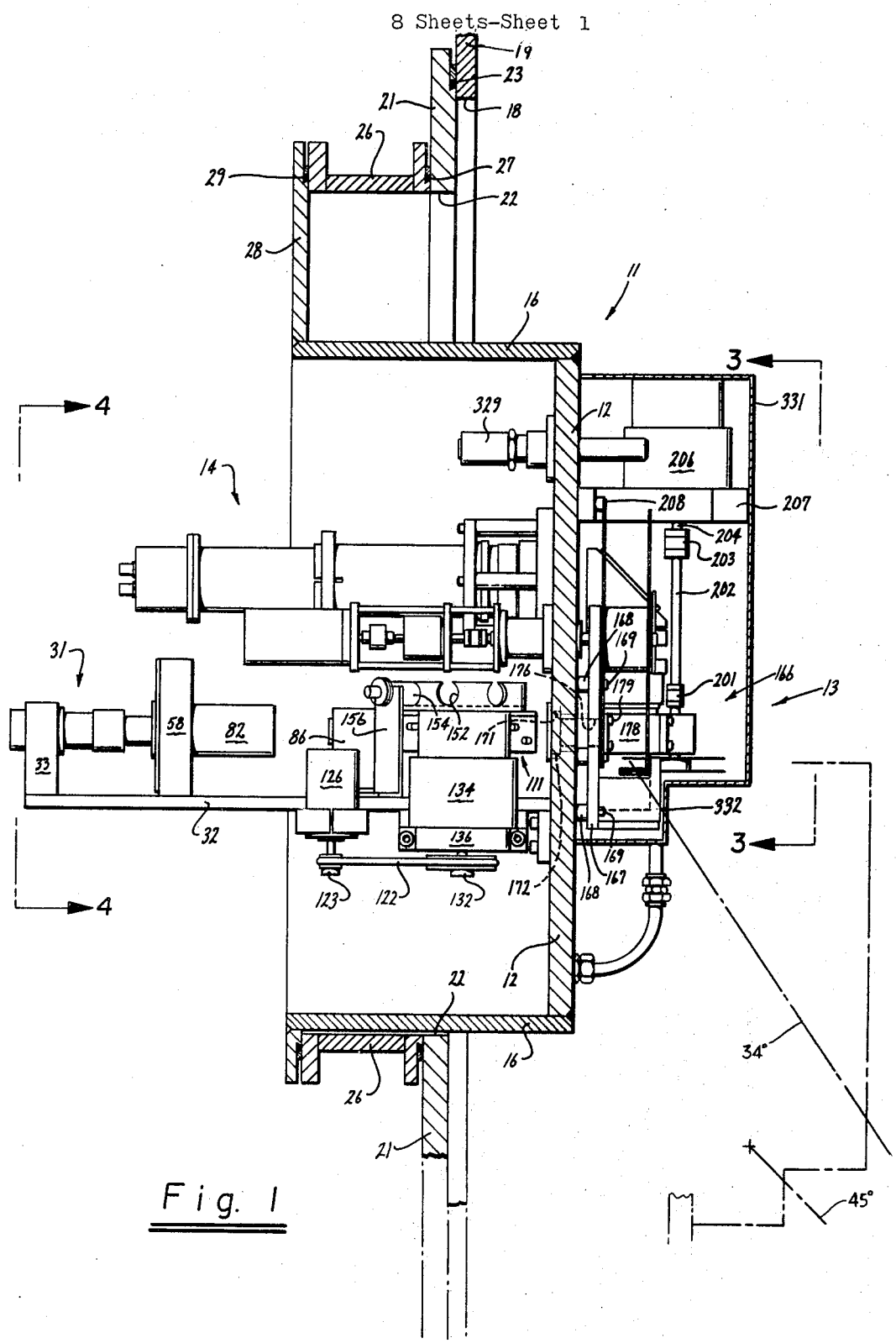
FIG. 1 is a side elevational view of an optical thickness rate monitor incorporating the present invention.

The optical thickness rate monitor consists of the main housing 11 which also may be called a thimble. The main housing 11 is provided with a main wall 12 which has a vacuum assembly 13 mounted on one side and an atmosphere assembly 14 mounted on the other side. The main housing 11 is generally rectangular in cross-section and is provided with spaced parallel walls 16 which are secured to the main wall 12 at right angles thereto and additional spaced parallel walls 17 secured at right angles to the main wall 12 and to the walls 16.

The main housing 11 of the rate monitor is adapted to be mounted on a large vacuum chamber. Thus, as shown in FIG. 1, the main housing or thimble 11 is adapted to extend through a large opening 18 provided in the chamber wall 19 of the vacuum chamber. A cover 21 is provided with an opening 22 through which the housing 11 extends. An O-ring 23 is disposed between the cover 21 and the chamber wall 19. A spacer 26 is provided and engages the cover 21. An O-ring 27 is disposed between the spacer 26 and the cover 21. The main housing 11 is provided with a flange 28 which is secured thereto by suitable means such as welding and which has its outer extremity engaging the spacer 26. An O-ring 29 is disposed between the flange 28 and the spacer 26.

Figure 2:
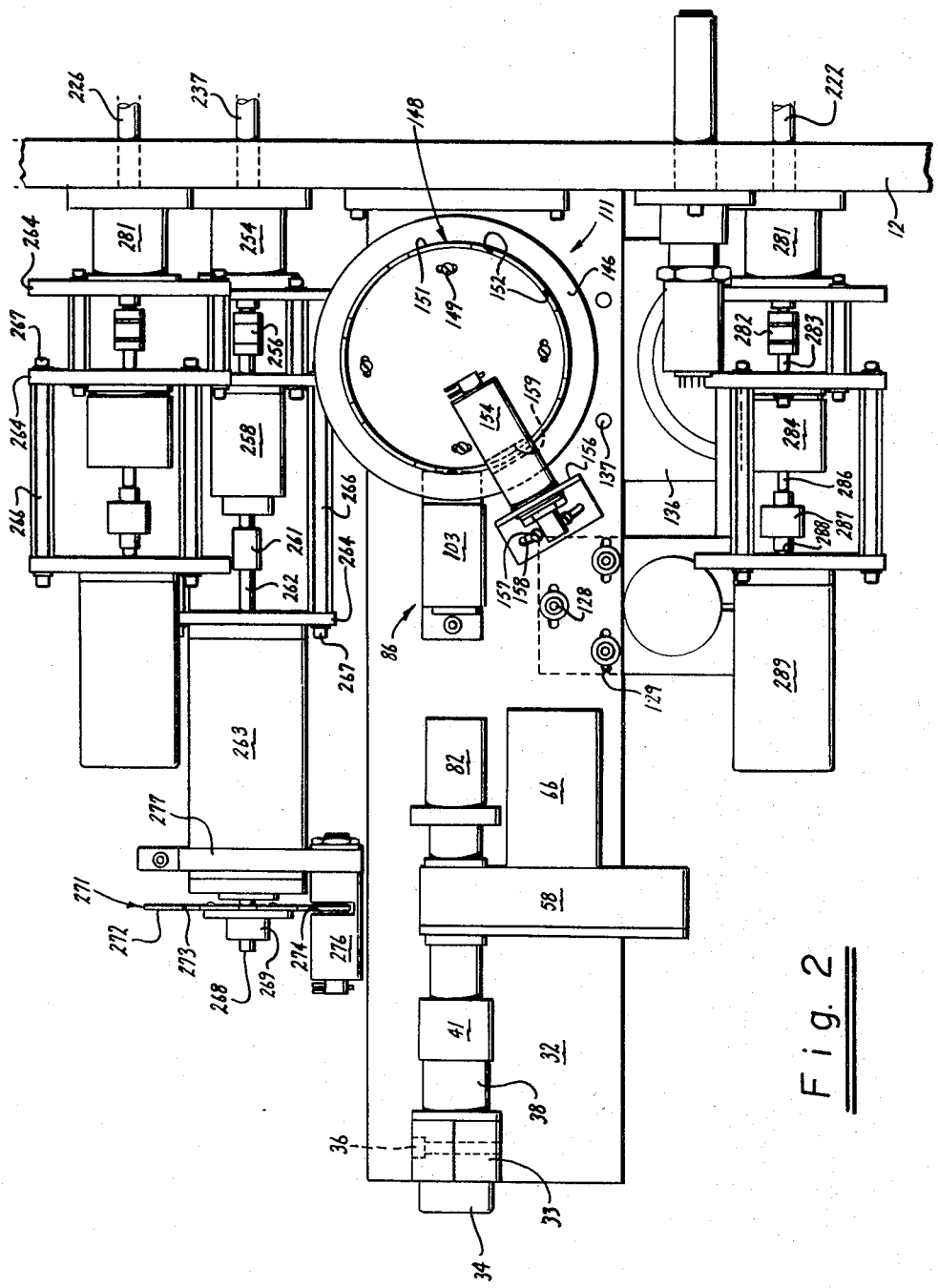
FIG. 2 is an enlarged top plan view of the atmosphere side of the monitor shown in FIG. 1.

The atmosphere assembly 14 includes a chopper assembly 31 which is mounted upon a large base plate 32 secured to the main wall 12 of the housing 11. The chopper assembly 31 consists of a pedestal 33 secured to the base plate 32. A lamp socket 34 is mounted in the upper part of the pedestal 33 which is split as shown in FIG. 2 and is clamped therein by a screw 36. A lamp 37 is mounted in the lamp socket 34. A lamp housing 38 extends over the lamp and is secured to the pedestal 33 by suitable means such as screws 39. A slip ring 41 is mounted on the outer extremity of the lamp housing 38 and also has mounted therein a lens mount housing 42. As can be seen, the lamp housing 38 and the slip ring 41 as well as the lens mount housing 42 are provided with axially aligned passages 43, 44 and 46, respectively. A sleeve 47 is slidably mounted within the lens mount housing 42 and carries a lens 48. The lens 48 is held in place by a nut 49. The sleeve 47 is also provided with a passage 51 which is axially aligned with the passages 43, 44 and 46 and similarly the nut 49 is provided with an axially aligned passage 52. The sleeve 47 can be held in the proper axial position so as to focus the image projected by the lens 48 and consists of a screw 53 which is threaded into the sleeve 47 and which extends through an elongate slot 54 provided in the lens mount housing 42.

The lens mount housing 42 is secured to a cover plate 56 by suitable means such as screws 57. The cover plate 56 forms a part of a chopper housing 58 which is formed in two parts, one of which is the cover plate 56 and the other of which is a cup-like member 59. The chopper housing 58 is light-tight and has a chopper disc or plate 61 disposed therein. The chopper disc 61 is provided with a hub 62 which is secured to a shaft 63 by suitable means such as a set screw 64. The shaft 63 is driven by an electric motor 66. The motor 66 is of a suitable type such as an 3,600 RPM synchronous direct drive motor. The chopper disc 61 is provided with a plurality of holes 67 spaced equally adjacent to the outer margin of the disc. By way of example, with a chopper disc of 4 inches in diameter, approximately 200 such holes can be provided which are approximately 0.226 inch in diameter.

An aperture plate 71 is mounted in one end of a sleeve 72 and is provided with an aperture 73. The sleeve 72 is mounted in a hole 74 provided in the cup-like member 59 of the chopper housing 58 and is positioned in such a manner that the aperture 73 carried by the aperture plate 71 is immediately opposite the holes 67 in the chopper disc 61 as it is rotated. The aperture 73 is relatively small to ensure that only one hole at a time in the chopper disc will be exposed by the aperture. The cover plate 56 is provided with a hole 76 which is in axial alignment with the hole 74. The sleeve 72 extends into a mounting member 77 which is secured to the cup-like member 59 by screws 78. The mounting member 77 is provided with a passage 79 in axial alignment with the aperture 73 so that any image passing through the aperture 73 can pass through a lens 81 carried by a lens housing 82. The lens housing 82 is slidably mounted on the mounting member 77 so that the image from the lens 81 can be focused. The lens 81 is held in place by a nut 83.

The light from the chopper assembly 31 impinges upon a beam splitter assembly 86. The beam splitter assembly 86 consists of a support block 87 which is secured to the base plate 32 by screws 88 and by dowel pins (not shown). The support block 87 is provided with a passage 91 which is in the upper portion of the support block 87 and extends in a generally horizontal direction. The support block is also provided with a slot 92 which extends through the support block 87 in such a manner that it opens into the passage 91 and extends at an angle with respect to the passage 91. A beam splitter 93 is mounted within the slot 92 as shown and engages a pin 94 provided in the slot 92. The beam splitter 93 is held in place by a spring member 96 which is secured to the support block 87 by screws 97. The beam splitter 93 is held against the pin 94 by the force of gravity. An iris diaphragm 98 is rotatably mounted on the support block 87 on the forward end of the passage 91. Suitable means is provided for mounting the iris diaphragm 98 and consists of a pair of shoulder members 99 which are secured to the support block 87 by screws 101. The iris diaphragm 98 is provided with a handle 102 to facilitate rotation of the same. A cover plate 103 (see FIG. 2) is mounted upon the support block 87 and serves to close the open sides of the passages 91 and 92. The cover plate is held in place by screws 104.

The beam splitter 93 is provided with spaced, parallel surfaces 106 and 107 on opposite sides of the beam splitter. These surfaces 106 and 107 are provided with coatings as hereinafter described.

Figure 5:
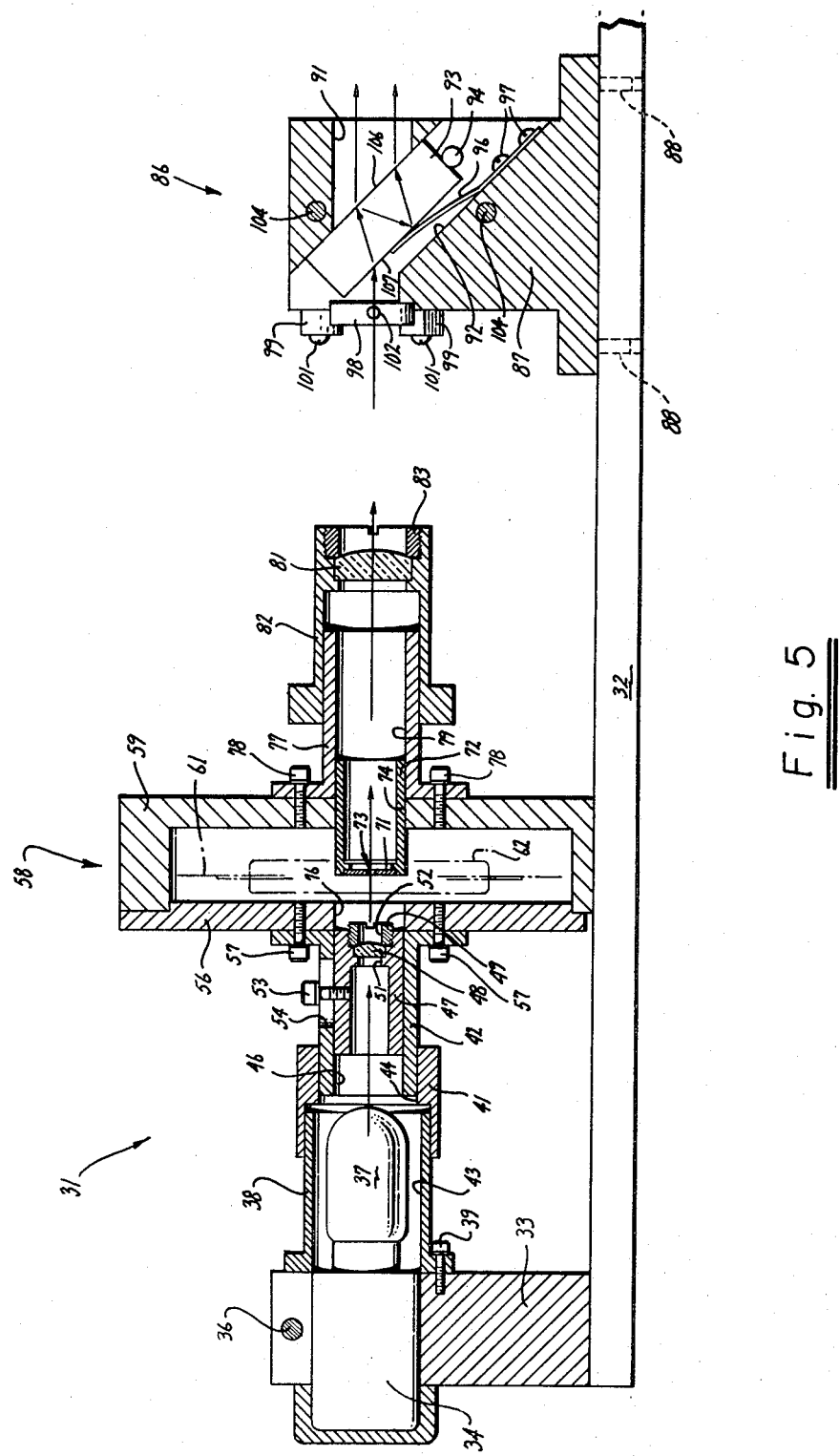
FIG. 5 is an enlarged side elevational view, partially in cross-section, of a portion of the monitor shown in FIG. 1 and particularly showing the chopper assembly and a beam splitter assembly.

Thus, the beam splitter 93 is provided with an anti-reflection coating for optimum transmittance on surface 107 in the area where the light beam first strikes surface 107. As can be seen from the arrows shown in FIG. 5, a portion of the light beam which is received by the beam splitter is transmitted by a beam splitter coating on surface 106 of the beam splitter, whereas another portion of the light beam is reflected downwardly to an area of surface 107 which is provided with a mirror coating which fully reflects the light through the beam splitter and through another anti-reflection coating provided on an area of surface 106 for maximum transmittance. The result is that the beam splitter provides a pair of spaced parallel beams from a single beam.

The light beam from the beam splitter 86 is supplied to an octagon prism assembly 111. The octagon prism assembly 111 consists of a cylindrical cup-shaped housing 112 which is provided with a centrally disposed hub portion 112a which receives the upper end of a shaft 113. The housing 112 is secured to the shaft 113 by a set screw 114. The shaft 113 is rotatably mounted in a pair of spaced ball bearing assemblies 116 mounted within a flanged bearing housing 117. The flanged bearing housing 117 is secured to the base plate 32 by cap screws 118.

Figure 4:
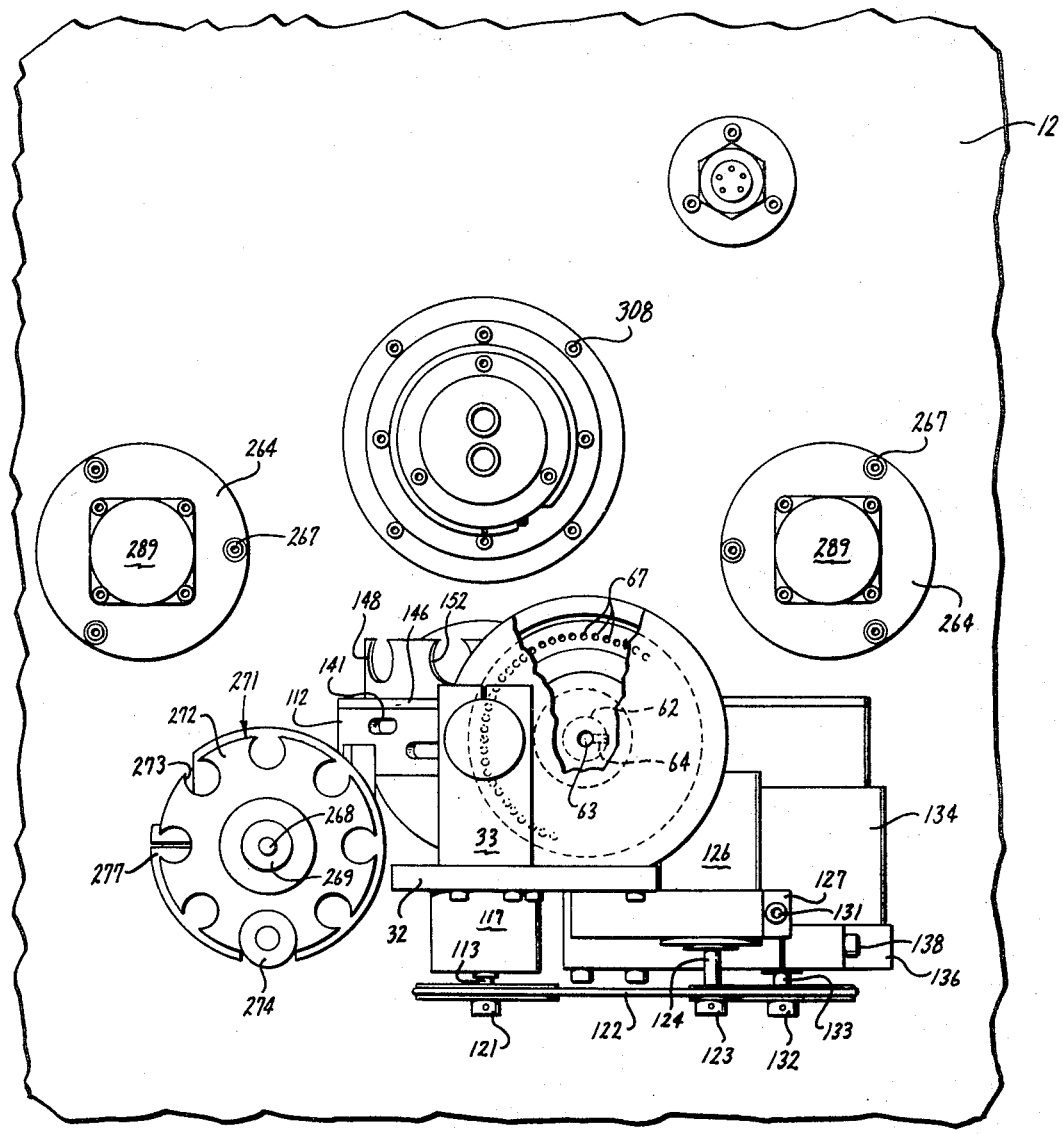
FIG. 4 is a rear elevational view of the monitor shown in FIG. 1 looking along the line 4—4 of FIG. 1.

A pulley 121 is mounted on the lower extremity of the shaft 113 (see FIG. 4) and is driven by a timing belt 122. The timing belt 122 is driven by a pulley 123 mounted on the output shaft 124 of a synchronous motor 126. The motor 126 is mounted in a split bracket 127 secured to the base plate 32 by cap screws 128 which extend through slots 129 provided in the base plate 32 and are threaded into the split bracket 127. A cap screw 131 is mounted in the bracket 127 for securing the motor 126 in the desired position in the bracket.

The timing belt 122 also drives another pulley 132 mounted on a shaft 133 of a synchro-transmitter 134. The synchro-transmitter 134 is secured to the base plate 32 by a split bracket 136 secured to the base plate 32 by cap screws 137. Cap screw 138 is provided for fastening the synchro-transmitter 134 in th desired position within the bracket 136.

The cylindrical housing 112 is provided with two spaced rows of elongated slots 141 which are equally spaced around the circumference of the cylindrical housing. Thus, there are provided 8 of these slots in each row with the slots in one row being skewed with respect to the slots in the other row by a suitable angle such as 22.5°.

A pair of octagonal prisms 142 and 143 formed of a suitable material such as flint glass are mounted within the cylindrical housing 112. As can be seen particularly in FIG. 7, the two octagonal prisms 142 and 143 are each provided with 8 flat surfaces 144. The prisms 142 and 143 are arranged in such a manner that the surfaces 144 of each of the prisms are immediately opposite the slotted openings as shown particularly in FIG. 7. Thus, since the slots 141 in the two rows are skewed by 22.5° with respect to each other, the surfaces 144 of the octagonal prisms 142 and 143 are also skewed 22.5° with respect to each other.

Means is provided for retaining the prisms 142 and 143 within the housing 112 and consists of suitable means such as a plastic cement. A cover plate 146 is mounted on the cylindrical housing 112 by suitable means such as screws 147. A synchronizing wheel 148 is secured to the cover plate 146 by screws 149 (see FIG. 7). The synchronizing wheel 148 is provided with a cylindrical upstanding wall 151 which has a plurality of openings 152 evenly spaced along the circumference of the wall 151 with the number of openings 152 corresponding to the number of sides provided on the prisms 142 and 143 and the number of slots 141 in each row of slots.

From the foregoing construction, it can be seen that the synchronous motor 126 will drive the octagon prism assembly 111, the synchronous detector wheel 148 and the synchro-transmitter 143 so that all are driven synchronously. In other words, they are locked together and rotate at a predetermined speed as, for example, 600 RPM.

Figure 10:
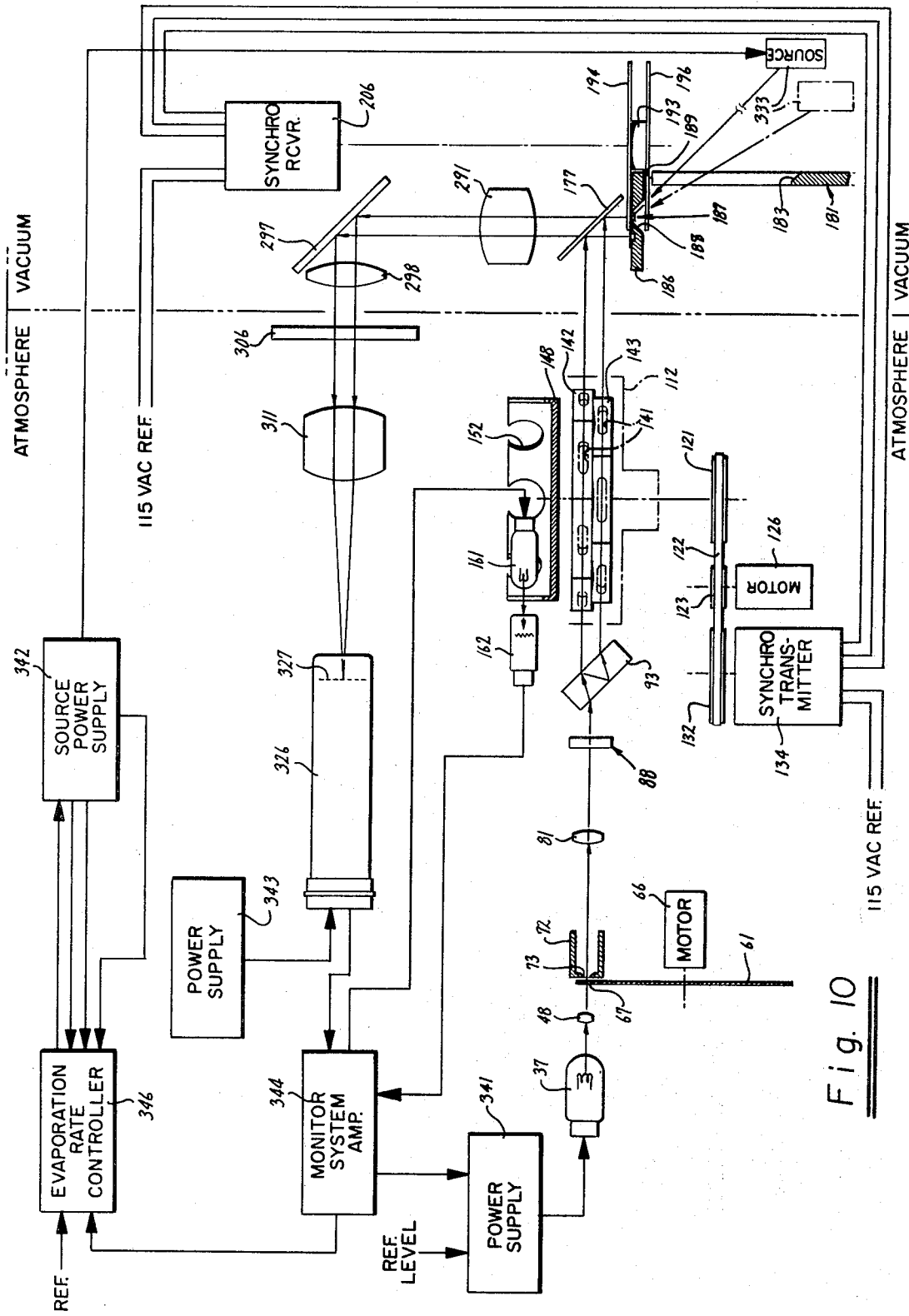
FIG. 10 is a schematic illustration of the monitor together with the necessary associated circuitry.

Means is provided for sensing rotation of the synchronous detector wheel 148 and consists of a housing 154 secured to an L-shaped bracket 156. The bracket 156 is mounted upon the base plate 32 by screws 157 extending through slots 158 provided in the bracket 156. The housing 143 is provided with a slot 159 extending upwardly from the bottom side intermediate the ends of the housing so that the wall 151 of the synchronous detector wheel 148 can rotate through the slot 159 as shown in FIG. 2. A lamp 161 is mounted in the housing 154 on one side of the slot 159, as can be seen in FIG. 2 and FIG. 10. Light from the lamp 161 can travel through the openings 152 provided in the wall 151 of the wheel 148 and be received by a photosensitive detector 162 which is mounted in the housing 154 on the opposite side of the slot 159 and outside the wheel 148.

It should be noted that the spacing between the two rows of slots 141 and the size of the slots 141 is such so that there is some space between each pair of slots from each of the two rows so that there is a finite period of time in which no light is being transmitted through the octagon prism assembly 111. Thus, there is provided a dwell time which is utilized for a purpose hereinafter described.

After the two light beams leave the octagon prism assembly 111, they impinge upon the film frame projection assembly 166 which is mounted on the vacuum side of the main wall 12. This film frame projection assembly 166 consists of a generally U-shaped base plate 167 which is secured to but spaced from the wall 12 by spacers 168 and cap screws 169. The main wall 12 is provided with an opening 171 (see FIG. 8) in which there is mounted a window 172. Suitable means is provided for establishing sealing engagement between the window 172 and the main wall 12 and includes an O-ring 173. The window 172 is positioned in such a manner that the light from the octagon prism assembly 111 can pass through the window 172 and the opening 171 and then through an opening 176 provided in the base plate 167.

The light beams impinge upon a beam splitter 177 which is of a conventional type. For example, it can be formed of a thin piece of glass with a conventional beam splitter coating provided on it so that approximately 50 percent of the light coming from the octagonal prism assembly is reflected downwardly as indicated by the arrows in FIG. 8 and then reflected back through the beam splitter 177. Beam splitter 177 is carried at a 45° angle as shown in FIG. 8 and is mounted in a beam splitter housing 178. The beam splitter housing 178 is secured to the base plate 167 by cap screws 179.

Figure 3:
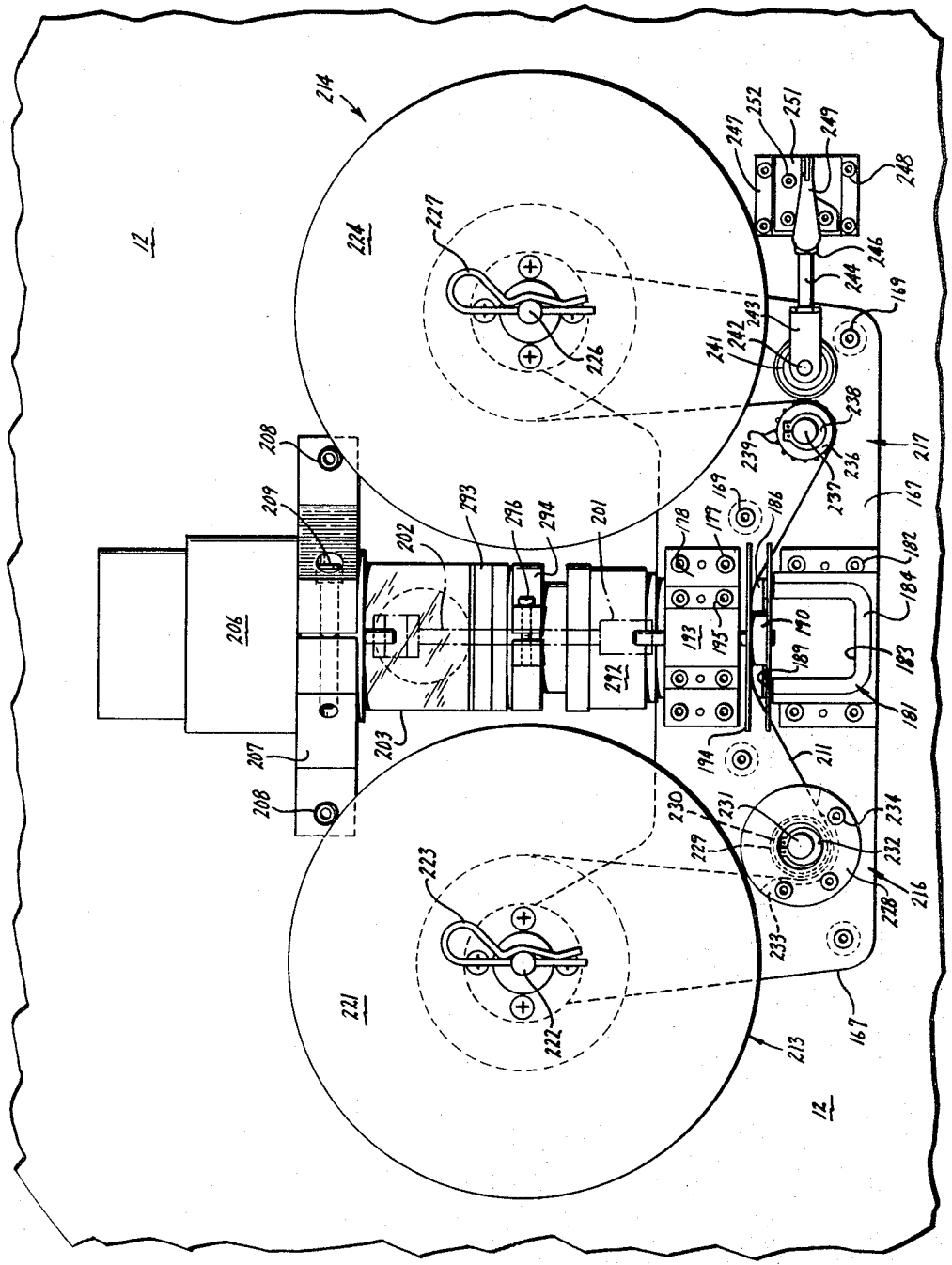
FIG. 3 is a front elevational view of the monitor looking along the line 3—3 of FIG. 1.

A film head housing 181 is also mounted on the base plate 167 below the beam splitter housing 178 and is secured to the base plate 167 by cap screws 182. The housing 181 is provided with a rectangularly-shaped window 183 which faces outwardly in the forward direction. The window 183 is bounded by an inclined side wall 184 so that the vapor stream can be properly monitored as hereinafter described. The film head housing 181 is generally box-shaped in configuration and is provided with a top wall 186, the outer side margins of which are curved as shown in FIG. 3 so that it can serve as a film guide shoe. The top wall 186 is provided with a circular aperture 187 (see FIGS. 9 and 10). The top wall 186 is also provided with downwardly and outwardly inclined side walls 188 which form the aperture 187. The aperture 187 and the window 183 are positioned so that the coating stream can pass therethrough as hereinafter described. The housing 181 is formed in such a manner so as to keep out as much stray light as possible. The housing 181 is provided with a slot 189 immediately below the top wall 186 which extends across the housing for a purpose hereinafter described.

A chopper assembly 191 is mounted below the beam splitter housing 178 and consists of a shaft 192 which is rotatably mounted in a bearing housing 193 secured to the beam splitter housing 178 by cap screws 195. A hub 190 is mounted on the shaft 192 and carries upper and lower chopper wheels or discs 194 and 196. The upper chopper wheel or disc 194 rotates in a plane which is immediately above the top of the top wall 186 of the film head housing 181 and the lower chopper wheel or disc 196 rotates in the slot 189 immediately below the top wall 186 in such a manner that both chopper wheels extend over the aperture 187 which is provided in the top wall 186. As can be seen from FIG. 12, both of the wheels or discs 194 and 196 are provided with eight blades 197 and the necessary openings 198 between the blades. The spacing between the openings 198 and the blades 197 is such so that the top or upper wheel 194 exposes the aperture 187 40 percent of the time and closes the aperture 60 percent of the time, whereas the lower wheel 196 exposes the aperture 187 40 percent of the time and closes it 60 percent of the time. It should also be noted that the upper and lower blades are 180 electrical degrees out of phase so that the upper blade blocks the aperture when the lower blade exposes it and vise-versa. It can be seen in this arrangement that there is total overlap between the two wheels with respect to the aperture and so no light can pass through the aperture 187 and through both blades 196 and 194 at the same instant in time.

The shaft 192 for the chopper assembly 191 is driven by a flexible coupling 201 connected to a shaft 202. Shaft 202 is connected to another flexible coupling 203 which is connected to the output shaft 204 of a synchro-receiver 206. The synchro-receiver 206 is carried by a large split mounting block 207 which is secured to the main wall 12 by cap screws 208. The synchro-receiver 206 is clamped within the mounting block 207 by a screw 209 threaded into the mounting block as shown particularly in FIG. 3.

A substantially transparent length of flexible elongate element 211 in the form of a thin strip of film, such as 35 mm. film, is positioned so that it is adapted to travel over the top of the film shoe or top wall 186 of the film head housing so that one side of the same will be exposed through the aperture 187 as it is advanced past the aperture.

A film drive system 212 is provided for advancing the film 211 past the aperture. This film drive system 212 consists of a supply reel assembly 213, a take-up reel assembly 214, an idler wheel assembly 216 and a capstan drive assembly 217. The supply reel assembly 213 consists of a conventional reel 221 which is mounted upon and keyed to a shaft 222. The reel 221 is held on the shaft 222 by a cotter pin 223.

The take-up reel assembly 214 also consists of a conventional reel 224 which is mounted upon and keyed to a shaft 226 so that it will rotate with a shaft 226. It is retained on the shaft 226 by cotter pin 227. A length of the film 211 is carried by the supply reel 221 and is taken up by the take-up reel 224. The film, after it leaves the supply reel 221, passes under the idler wheel assembly 216 which consists of a flanged idler wheel 228. The idler wheel 228 is provided with a hub 229, the central portion of which has been relieved or, in other words, provided with an annular recess as indicated by the broken line 230 so that only the side margins of the film are engaged by the idler wheel as the film passes over the same. This prevents a portion of the film between the side margins of the same from being contacted by any mechanical parts for a purpose hereinafter described. The idler wheel 228 is retained on a shaft 231 by a retaining ring 232. The shaft 231 is mounted upon a mounting plate 233 which is secured to the base plate 167 by cap screws 234.

The film 211, after passing from the idler assembly, passes over the top wall or film guide shoe 186 and then passes under the capstan drive assembly 217. The capstan drive assembly 217 consists of a capstan 236 which is mounted upon and keyed to a shaft 237. The capstan 236 is retained on the shaft 237 by a retaining ring 238. The length of film 211 is preferably provided with perforations along at least one edge of the same which are adapted to be engaged by pins 239 carried by the capstan so that the film will be positively advanced by the capstan. The film 211 is held in engagement with the capstan by suitable means such as a rubber-covered roller 241. The rubber-covered roller 241 is rotatably mounted upon a shaft 242 mounted in a yoke 243. The yoke 243 is secured to a shaft 244 that is slidably mounted in a bracket 246 mounted upon a block 247 secured to the main wall 12 by cap screws 248. A lever arm 249 is pivotally mounted on a bracket 251 secured to the mounting block 247 by cap screws 252. A toggle link (not shown) is connected to the lever arm 249 and to the shaft 244 whereby the roller 241 may be moved into and out of engagement with the capstan 236 merely by shifting the lever arm 249 between open and closed positions.

The capstan drive shaft 237 extends through the main wall 12 and through a vacuum feed-through 254 for a rotary shaft mounted on the main wall 12. The shaft 237 is connected to a flexible coupling 256 which is connected to the output shaft 257 of a gear reducer or speed reducer 258. The input shaft 259 of the speed reducer is connected to a coupling 261. The coupling 261 is connected to the output shaft 262 of a variable speed drive motor 263. As can be seen particularly from FIG. 2, the parts hereinbefore described are carried by a plurality of plates 264 which are held apart in a spaced relationship by spacers 266 and cap screws 267 in such a manner that the entire assembly is supported by the main wall 12.

The motor 263 is provided with an additional output shaft 268. A hub 269 is mounted upon the shaft 268 and carries therewith a chopper disc or wheel 271 and is provided with a plurality of blades 272 formed by placing openings 273 in the outer periphery of the disc 271. The chopper disc 271 travels in a slot 274 provided in a housing 276. The housing 276 is mounted in a clamp 277 secured to one end of the variable speed drive motor 263. This housing 276 is substantially identical to the housing 154 and carries a lamp (not shown) which is disposed on one side of the chopper disc 271 and a photosensitive detector (not shown) which is disposed on the other side of the chopper disc. As hereinafter described, the photosensitive detector will give an indication of the speed of rotation of the output shaft 268 of the variable speed drive motor 263 so that the variable speed drive motor 263 can be controlled as a d.c. servo motor generator.

The shafts 222 and 226 for the take-up and supply reels are driven so that the length of film 211 is continuously under tension. Each shaft is provided with a vacuum feed-through 281 for a rotary shaft which is mounted upon the main wall 12. The shafts 222 and 226 are each connected to a flexible coupling 282. The flexible coupling 282 is connected to the output shaft 283 of a conventional magnetic clutch assembly 284. The input shaft 286 of the magnetic clutch assembly is connected to a coupling 287. The coupling 287 is connected to the output shaft 288 of a gear motor 289 of a suitable type such as an a.c. hysteresis motor. Thus, it can be seen that various parts of the apparatus for driving the shafts 222 and 226 are supported by the space plates 264 of the type hereinbefore described.

The motors 289 are reversed in direction and it is their sole purpose through the magnetic clutch assemblies 284 to continuously maintain tension on the length of film. The length of film 211 is actually driven by the capstan drive assembly 217 which controls the speed of movement of the film.

The two light beams which are reflected upwardly through the beam splitter 177 through a multi-element lens assembly 291 mounted within a lens housing 292. Another housing 293 is mounted above the housing 292 and is clamped to the housing 292 by a split clamp 294 which is provided with a screw 296 for tightening the same. A mirror 297 which is provided with a first surface reflective coating is mounted within the housing 293 so that it is disposed at an angle of 45° with respect to the two beams passing through the lens assembly 291. A double element lens 298 is also mounted within the housing 293 and receives the beams after they have been reflected by the mirror 297. The lens 298 is mounted in front of an opening 299 provided in the housing 293 so that the light beams passing through the lens 298 can pass through the opening and thence into an opening 301 provided in the main wall 12. A window 302 is mounted in the wall 12 and closes the opening 301. An O-ring 303 is provided for establishing a sealing engagement between the window 302 and the wall 12. The two light beams then pass through a filter 306 mounted in a filter housing 307. The filter housing 307 is secured to the main wall 12 by cap screws 308. An O-ring 309 is provided for establishing sealing relationship between the filter housing 307 and the window 302.

The light beams, after passng through the filter 306, pass through a multi-element lens assembly 311 mounted in a lens housing 312 which is threaded into the support housing 314. Spacers 313 are mounted upon the filter housing 307. A support housing 314 is mounted upon the spacers 313 by cap screws 316. A photomultiplier tube housing 317 is slidably mounted in the support housing 314. A split clamp 318 encircles the support housing 314 and is provided with a screw 319 for fastening the housing 317 within the housing 314. The socket housing 321 is provided which is secured to a fitting 322 by cap screws 323. The fitting 322 is threaded into the housing 317. A photomultiplier tube 326 is mounted within the housing 317 and has its cathode 327 (see FIG. 10) mounted at a point where the two light beams converge to a point.

An electronic feed-through assembly 329 is mounted in the wall 12 for supplying power to the synchro-receiver 206.

A large water-cooled shield 331 is provided as a part of the vacuum assembly 313 and encloses the same. The shield 331 is provided with an opening 332 through which vapors from an evaporation source 33 can enter the film head housing 181.

Figure 11:
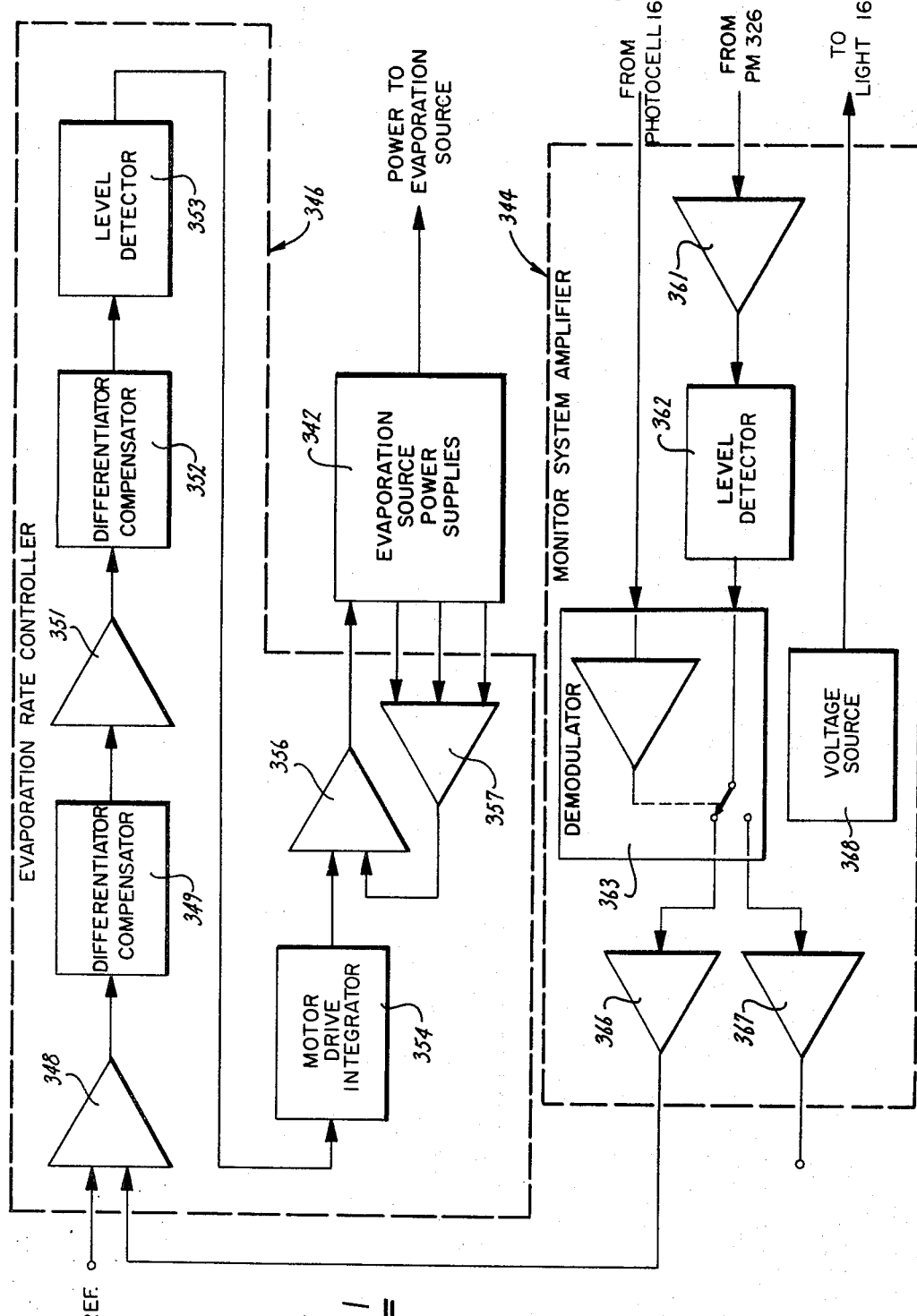
FIG. 11 is a block diagram of the monitor system amplifier and the evaporation rate controller shown in FIG. 10.

The optical thickness rate monitor also includes electrical and electronic systems which are schematically illustrated in FIGS. 10 and 11. Thus, there is shown in FIG. 10 a power supply 341 for the lamp 37. A power supply 342 is provided for supplying power to the source 333. A power supply 343 is provided for supplying power to the photomultiplier tube 326. Also, there is provided a monitor system amplifier 344 and an evaporation rate controller 346.

The evaporation rate controller 346 consists of an error amplifier 348 which supplies its output to a differentiator compensator 349. The output of the differentiator compensator 349 is supplied to a non-linear amplifier 351, the output of which is supplied to another differentiator compensator 352. The output of the differentiator compensator 352 is supplied to a level detector 353 and the output of the level detector 353 is supplied to a motor drive integrator 354. The output of the motor drive integrator 354 is supplied to an error amplifier 356 whose output is supplied to the evaporation source power supplies 342. Three outputs 342 from the evaporation source power supplies 342 are supplied to a summing amplifier 357 and the output of the summing amplifier is supplied to the error amplifier 356.

The monitor system amplifier 344 consists of a 12 kc tuned amplifier 361 which receives its input from the photomultiplier tube 326. The output of the amplifier 361 is supplied to a linear full wave low level detector 362. The output of the level detector 362 is supplied to a demodulator 363. The demodulator 363 receives its signal from the photocell 162. The demodulator is schematically illustrated as consisting of an amplifier which operates a switch so that the signal from the level detector 362 is supplied to either an amplifier 366 or an amplifier 367. The amplifier 366 is a suitable type such as a low pass amplifier whic has a cutoff response of 40 db. The amplifier 367 is a wide band amplifier. The monitor system amplifier 344 also includes a voltage source 368 for the light 161.

Operation and use of the optical thickness rate monitor in performing the present method may now be briefly described as follows. Let it be assumed that the optical thickness rate monitor has been mounted in the side wall of a vacuum chamber in such a position so that it is adapted to receive the vapor stream from an evaporation source such as source 333 and that it is desired to continuously monitor the evaporation from this source and to control the rate of evaporation from the source.

Light is supplied from the lamp 37 and passes through the lens 48 which images the light from the filament of the light source onto the holes 67 provided in the chopper disc or blade 61. The aperture 73 in the sleeve 72 prevents light from passing through any more than onee hole 67 in the chopper disc 61. The lens 81 re-focuses the light which passes through the chopper blade. The light then strikes the beam splitter 93 and forms the beam from the lens 81 into two separate spaced parallel sample and reference beams which are spaced in such a manner so that one of the light beams will pass through the prism 142 and the other light beam will pass through the prism 143. The two light beams are thus chopped out of phase with each other because of the spacing between the openings 141 permitting light to enter and leave the octagonal prisms 142 and 143. As pointed out previously, the spacing between pairs of openings 141 is such that there are periods of time in which no light passes from either of the octagonal prisms 142 and 143.

The portions of the light beams which pass from the octagonal prisms 142 and 143 strike the beam splitter 177 and are deflected downwardly onto the back side of and through the length of film 211 in the region in which the film is exposed by the aperture 187 to the vapor stream passing from the source 333. Depending upon the quantity of coating material which is deposited upon the other side of the length of film 211, a certain portion of the one beam which sees the coating material is reflected upwardly and passes through the beam splitter 177. A constant percentage (depending only on the properties of the uncoated film) of the other beam which does not see the coating material is reflected upwardly and passes through the beam splitter 177. The beams continue to pass upwardly as shown in FIG. 10 through the lens assembly 211 which serves to cause partial convergence of the image carried by the beams. The beams then pass upwardly and are reflected through 90° by the mirror 297. Both light beams then pass through the lens 298 and then through a band pass filter 306 which selects the desired wavelength and excludes the undesired wavelengths. The light beams then pass through a lens assembly 311 which causes the two light beams to converge at a point which generally lies in a plane in which the cathode 327 of the photomultiplier tube 326 lies.

The combination of the lens assembly 291, the plane mirror 297, the lens 298, the band pass filter 206 and the lens assembly 311 can be adjusted to form an image of the film 211 onto the photomultiplier tube 327. Alternatively, it is possible to focus an image of the iris diaphragm 88 onto the photomultiplier tube 327. The second or alternative method is preferred over the first method because the gain of the photomultiplier for the cathode varies as a function of beam position on the cathode of the photomultiplier. Since the second method places all the light from both beams in one spot on the photomultiplier tube, the gain for both reference and sample beams is the same at all times independent of beam position on the photomultiplier tube. By way of example, using the system of the type hereinbefore described, it was found to be possible to focus all the light from both beams reflected from the film 211 into a spot smaller than one-eighth of an inch in diameter onto the photomultiplier tube 326.

The reference beam can be identified as the beam which passes through the upper octagon prism 142, whereas the sample beam can be considered as the beam passing through the octagon prism 143.

In one embodiment of the present invention, the chopper disc 61 chopped the light from the lamp 37 at the rate of 12,000 cycles per second.

As pointed out previously, the octagon prisms 142 and 143, the synchronous detector wheel 148 and the synchro-transmitter 134 are all tied together by the timing belt 122 and are driven by a common motor 126 which has a speed of 1,800 RPM. The pulley 132 on the synchro 134 and the pulley 121 on the octagon prisms 142 and 143 are both three times the diameter of the pulley 123 on the motor. Thus it can be seen that the synchro and octagon prisms rotate at 600 RPM.

The octagon prisms 142 and 143 cause the light beams which are approximately one-eighth inch in diameter at the plane where they strike the film 211 to linearly traverse the film in the direction of travel of the film for approximately three-fourths inch. By linearly scanning the film in this manner, it is possible to reduce the variations in signal level due to imperfections in the film by an averaging process and also to eliminate the need for precise positioning of the sample beam over the aperture 187.

The synchronous detector wheel 148 in conjunction with the light source 161 ane the photocell 162 provide a reference signal for the synchronous demodulator 363 of the monitor system amplifier 344. Since the synchronous detector wheel 148 is provided with either holes or openings 152 and both of the octagon prisms 142 and 143 have eight faces, the chopping frequency and the scanning frequency is 80 cycles per second. The synchro-transmitter 134 which is driven by the motor 126 sends an electrical signal to the synchro-receiver 206. As is well known to those skilled in the art, the shaft position of the synchro-receiver 206 will follow the shaft position of the synchro-transmitter 134.

The chopper wheels 194 and 196 are mechanically linked to the shaft 204 of the synchro-receiver as hereinbefore described. The chopper discs 194 and 196 are each provided with eight openings and are phased in such a manner so that when light from the sample beam can travel through the chopper disc 194, coating material is blocked from striking the film 211 through the chopper disc 196 and when coating material can travel through the chopper disc 196 to strike the bottom side of the film 211, light from the sample beam cannot travel through the chopper disc 194 to the back side of the film 211. In this manner, the two chopper discs 194 and 196 in combination serve to prevent light from the coating source from entering the system and being transmitted to the photomultiplier tube 326 and possibly saturating the photomultiplier tube 326 because the coating source may be extremely bright.

The anti-reflection coating provided on the beam splitter 93 serves to reduce to a minimum the reflection from the first surface of the beam splitter 93, thus transmitting maximum light through the beam splitter to the beam splitting coating provided on the surface 106. By way of example, such a beam splitting coating typically transmits approximately 50 percent of the light to the octagon prism 142 and reflects approximately the other 50 percent to the mirror coating carried by the surface 107. The mirror coating reflects approximately 90 percent of the light which is incident on it to the anti-reflection coating carried on the surface 106 which transmits substantially all of that light to the lower octagon prism 143.

As pointed out previously, the openings or windows 141 provided for the octagon prisms 142 and 143 have a size so that light can only pass through the octagon prism 142 only when there is no light passing through the octagon prism 143, and conversely, light can only pass through the octagon prism 143 when there is no light passing through the octagon prism 142. The phase relationship between the chopper discs 193 and 194 and the octagon prisms 142 and 143 must be such that light passing through octagon prism 143 will never strike the chopper disc 194. This phasing can be readily accomplished by shifting the synchro-receiver 206 within its mounting block 207 and then securing it in the desired position.

The output from the photomultiplier tube 326 is supplied to the monitor system amplifier 344 which processes the signal and compensates it so that when the loop is closed through the evaporation source power supply 342 and the evaporation source 333, oscillations will not occur. A reference 36 is supplied for the evaporation rate controller 346 and is used to set the desired evaporation rate. The reference level for the power supply 341 is used to set the evaporation rate signal level.

From the schematic diagram which is shown in FIG. 10, it can be seen that several feedback loops are provided in the system. There is a loop which takes the reference light beam signal from the monitor system amplifier 344 and feeds it to the power supply 341. This input is compared with the reference level supplied to the power supply 341 and then a determination made to ascertain whether or not the intensity of the light source 37 should be changed so that the end result is that the reference signal from the monitor system amplifier 342 will be held at a constant level equal to the reference level supplied to the power supply 341.

The reference level for the power supply 341 is adjustable so that compensation can be made for various types of thin film materials that are utilized during the coating process. For example, if the high index material being utilized for the coating process has an index of refraction which is higher than the index of refraction for the film 211 which is being utilized, then the reflection level or signal level must be set at a low value or low percent of full scale so that when the coating material is applied to the film 211 and the reflection increases, the signal level can increase without saturating the photomultiplier tube 326. On the other hand, if a low index material is being utilized in the coating operation, that is, the coating material has an index of refraction which is less than the index of refraction of the film 211, then the reference level for the power supply 341 must be adjusted to a high percent of its maximum value so that when the coating material is applied to the film 211 and the signal level decreases, the signal will not go into the cut-off region for the photomultiplier tube.

As pointed out previously, at no time does any of the coating material coat the side of the film upon which the reference beam is incident. For this reason, the reference level for the power supply 341 is set at some fixed point. Thus if any component or light source, or the photomultiplier should vary its transmission intensity or gain within the reference signal closed loop, the light power supply 341 will cause the light level to increase or decrease to automatically compensate for that change and hold the signal level constant and equal to the reference level. It is for this reason that a dual beam system is utilized, i.e. a system with sample and reference beams.

As pointed out previously, the octagon prisms 142 and 143 cause the light beam to scan the film 211 in the direction of movement of the film for a distance which is greater than the size of the coating aperture 187. This prevents variations in signal level that would be seen if the sample and reference beams were not scanning the film and the beams were to move within the aperture 187. The scanning has an additional advantage in that it prevents signal variation due to imperfections in the film.

It should be pointed out that it is possible to utilize the principles of the present invention by scanning the front surface of the film. However, this does have the disadvantage in that it is necessary to frost or sandblast the back side of the film to prevent the sample and reference beams from seeing the back surface of the film.

The monitor system amplifier operation is as follows. The reference signals and the rate signal are time shared by the photomultiplier 326. These signals are both fed into the monitor system amplifier 344. The information from the photomultiplier tube 326 is supplied to a 12 kc tuned amplifier 361 which has a bandwidth of 1,200 cycles per second. This amplifier amplifies the signal level and is tuned to the frequency of the incoming signal. The output of this amplifier is detected by a linear full wave low level detector 362. The signal from the detector 362 is fed into the demodulator 363 which is controlled by a signal from the photocell 162. This demodulator 363 is synchronously switched in the proper phase and supplies a signal alternately to the rate amplifier 366 and the reference amplifier 367. The rate amplifier has a roll-off of 40 db per decade. The reference amplifier 366 is a wide band amplifier and provides the necessary compensation for the light power supply 341 to prevent the internal loop from oscillating.

The voltage source 368 for the light 161 is unregulated and is sufficient to keep the light at approximately 80 percent of its full brilliance. The light 161 supplies more than enough light to operate the photocell 162 fully on when light is incident upon the photocell 162 and when the synchronous chopper 148 prevents light from becoming incident on photocell 162, the photocell 162 is fully off.

The reference for the evaporation rate controller is set for the desired evaporation rate level to be obtained. The rate signal which is supplied from the amplifier 366 is compared with the reference by the error amplifier 348. A signal from the error amplifier 348 is supplied to a first differentiator compensator 349 of a conventional type. This compensator 349 feeds a signal into a non-linear amplifier 351. The non-linear amplifier feeds its signal to a second differentiator compensator 352. The first differentiator compensator serves to compensate for the time lag in the evaporation source, the crucible and the time constant of the coating material. The non-linear amplifier serves to compensate for the non-linear gain of the evaporation source. In other words, the evaporation rate of the evaporation source is not linearly related to the power level on the evaporation source. The second differentiator compensator serves to compensate for the time constant obtained with the optical thickness rate monitor itself.

Both differentiator compensators 349 and 352 are adjustable and the non-linear amplifier 351 is also adjustable.

The differentiator compensator 352 supplies a signal to the level detector 353 which operates a motor drive integrator 354. The level detector 353 causes the motor drive integrator to operate in one direction or the other. If the signal level from the second differentiator compensator is below plus or minus some preset voltage, which is adjustable, the level indicator does not drive the motor in either direction. If the signal is above this predetermined plus or minus voltage level, the level detector will drive the motor drive integrator in one direction for a positive voltage above the predetermined voltage level and in an opposite direction for a negative voltage below the predetermined voltage level. The motor drive integrator 354 supplies the signal to the error amplifier 356. This signal level from the motor drive integrator varies only during the time the motor is running and when the motor stops, the signal level is held constant at the value it had when the motor stopped. This signal level requires that the beam emission current signal from the evaporation source power supplies 342 be constant because of the action of the summing amplifier 57 supplying a signal to the error amplifier 356. A motor drive integrator 354 is utilized because of the long integrating time constants involved. By way of example, a time constant of five minutes may be present in the system. The motor drive integrator 354 is a motor driving a potentiometer.

The error amplifier 356 compares the signal from the motor drive integrator to a signal which is proportional to the sum of the three electron beam currents for the evaporation sources from the three electron guns as supplied by the summing amplifier 357. The error amplifier 356 supplies the signal to all of the power supplies and forces the current from the power supplies to be proportional to the signal received from the motor drive integrator 354. This has a distinct advantage because in the event any of the evaporation sources should fail, the other evaporation sources will assume the current which previously had been supplied to the malfunctioning power supply. By way of example, if three evaporation sources are utilized, it is possible with the present system that two of the power supplies can malfunction and the system would still operate satisfactorily because the one remaining power supply would assume the total power for all three of the evaporation sources to evaporate the necessary material for the coating operation.

During the time that the foregoing operations are taking place, the film 211 is beng continuously advanced by the capstan assembly 217. By utilizing the large tape reels 221 and 224, it is possible to store hundreds of feet of the film within the vacuum chamber in which the coating operation is taking place and to thereby continuously monitor the coating operations taking place for long periods of time. Thus, by way of example, it is possible to continuously monitor the operations in the vacuum chamber for a period as long as a week without shutting down the vacuum chamber.

The monitor measures the rate of evaporation because the thickness of the coating deposited on the film 211 is wedged or, in other words, is tapered in thickness along a direction which is parallel to the direction of movement of the film.

The rate monitor also has the unique advantage in that it does its monitoring from the back side of the film so that the field of view for the film is always clean. There is no problem of the coating material and the like obscuring the field of view of the film. In addition, the film itself is always clean and unmarred in the regions of interest.

We claim:

1. In a method for measuring the rate of deposition of material on an article while in a vacuum chamber by the use of a substantially transparent substrate spaced from the article and within the vacuum chamber having therein a source creating a vapor stream of said material continuously advancing the substrate past an aperture exposed to the vapor stream from said source whereby successive portions of said substrate are coated with material from said vapor stream at the same time that material is being deposited on the article, subjecting the substrate while in the chamber to a beam of radiation and measuring how said beam of radiation is affected by the coating material on said substrate to determine the rate of deposition of the coating material solely by determination of optical properties of the coating material.

2. A method as in claim 2 together with the step of causing the beam of radiation to scan the substrate for a predetermined distance in the direction of travel of the substrate.

3. A method as in claim 2 wherein the vapor stream impinges on one side of the substrate and wherein the beam of radiation impinges on the other side of the substrate opposite the side on which the materials are deposited on the substrate from the vapor stream.

4. A method as in claim 2 together with the step of automatically controlling the evaporation from said source in accordance with a characteristic of the material being deposited upon the substrate.

5. In a method for measuring the rate of deposition of material on an article while in a vacuum chamber by the use of a substantially transparent substrate in the vacuum chamber, creating a vapor stream of coating material at a predetermined rate within the vacuum chamber, continuously advancing the substrate in the vacuum chamber at a substantially constant speed so that one side of the substrate is exposed to the vapor stream whereby a layer of coating material from the vapor stream is deposited on successive portions of said one side of the substrate, and measuring the rate of deposition of successive portions of the coating being deposited on the substrate while the substrate is moving solely by a determination of optical properties of the coating.

6. A method as in claim 5 together with the step of providing a reference of the desired rate of deposition of the coating material on the substrate and changing the rate of creation of the coating material when the optical thickness measured differs from the reference until the desired rate of deposition is obtained.

7. In a method for measuring the rate of deposition of material on an article while in a vacuum chamber by the use of a substantially transparent substrate in the vacuum chamber, creating a vapor stream of coating material at a predetermined rate within the vacuum chamber, continuously advancing the substrate in the vacuum chamber at a substantially constant speed so that one side of the substrate is exposed to the vapor stream whereby a layer of coating material from the vapor stream is deposited on successive portions of said one side of the substrate, measuring the rate of deposition of successive portions of the coating being deposited on the substrate while the substrate is moving solely by a determination of optical properties of the coating, blocking said one side of the substrate from said vapor stream at periodic intervals so that alternate spaced portions of said one side are uncoated by said vapor stream, forming sample and reference beams which are chopped out of phase with each other in a manner which corresponds with the blocking of said one side of the substrate, directing the sample and reference beams toward the substrate so that they impinge upon the substrate while it is moving with the sample beam striking the coating portions and the reference beam striking the uncoated portions, and ascertaining the manner in which the sample and reference beams are affected by coated and uncoated portions of the substrate to thereby determine the thickness of the coating on the coated portions of the substrate solely by the optical properties of the coating.

* * * * *